United States Patent [19]

Kotsakis et al.

[11] 4,123,090

[45] Oct. 31, 1978

[54] PUSH-PULL FITTING

[75] Inventors: Mike D. Kotsakis, Mount Prospect; Albert J. Schwarz, Lincolnwood, both of Ill.

[73] Assignee: Imperial-Eastman Corporation, Chicago, Ill.

[21] Appl. No.: 706,823

[22] Filed: Jul. 19, 1976

[51] Int. Cl.² ............................................. F16L 21/02
[52] U.S. Cl. ...................................... 285/39; 285/340; 285/351
[58] Field of Search .................. 285/340, 39, 102, 101, 285/351

[56] References Cited

U.S. PATENT DOCUMENTS

| | | | |
|---|---|---|---|
| 2,484,192 | 10/1949 | Squiller | 285/340 X |
| 2,491,004 | 12/1949 | Graham | 285/340 X |
| 2,635,901 | 4/1953 | Osborn | 285/39 X |
| 2,691,537 | 10/1954 | Bashark | 285/340 |
| 3,151,897 | 10/1964 | Wagner | 285/340 X |
| 3,879,065 | 4/1975 | Kobayashi | 285/340 X |
| 3,909,046 | 9/1975 | Legris | 285/39 |
| 3,924,877 | 12/1975 | Leopold, Jr. et al. | 285/340 |
| 4,021,062 | 5/1977 | Mariaulle | 285/340 X |

FOREIGN PATENT DOCUMENTS

| | | | |
|---|---|---|---|
| 985,539 | 3/1951 | France | 285/102 |
| 1,486,956 | 5/1967 | France | 285/340 |
| 1,029,123 | 5/1966 | United Kingdom | 285/340 |

Primary Examiner—Thomas F. Callaghan
Attorney, Agent, or Firm—Wegner, Stellman, McCord, Wiles & Wood

[57] ABSTRACT

A tube fitting of the push-pull type wherein the tube end is connected to the fitting by a simple inward insertion thereof, and withdrawal of the tube is effected by a simple withdrawal movement thereof upon manual rearrangement of the fitting components. The fitting includes a spring finger locking element adapted to engage the tube end when inserted and effectively prevent outward axial withdrawal movement of the tube end. A manipulating device is provided for selectively disengaging the spring finger from the tube end to permit axial withdrawal of the tube end when desired. The disengaging device is a one-piece element and is associated with suitable seals for providing an accurately preselected prestressing thereof against the tube end and body to provide an improved seal of the tube end to the body. The spring fingers are defined by an annular element. In one form, additional structure is provided for providing different spring constants relative to axial outward and inward movement of the spring fingers.

14 Claims, 7 Drawing Figures

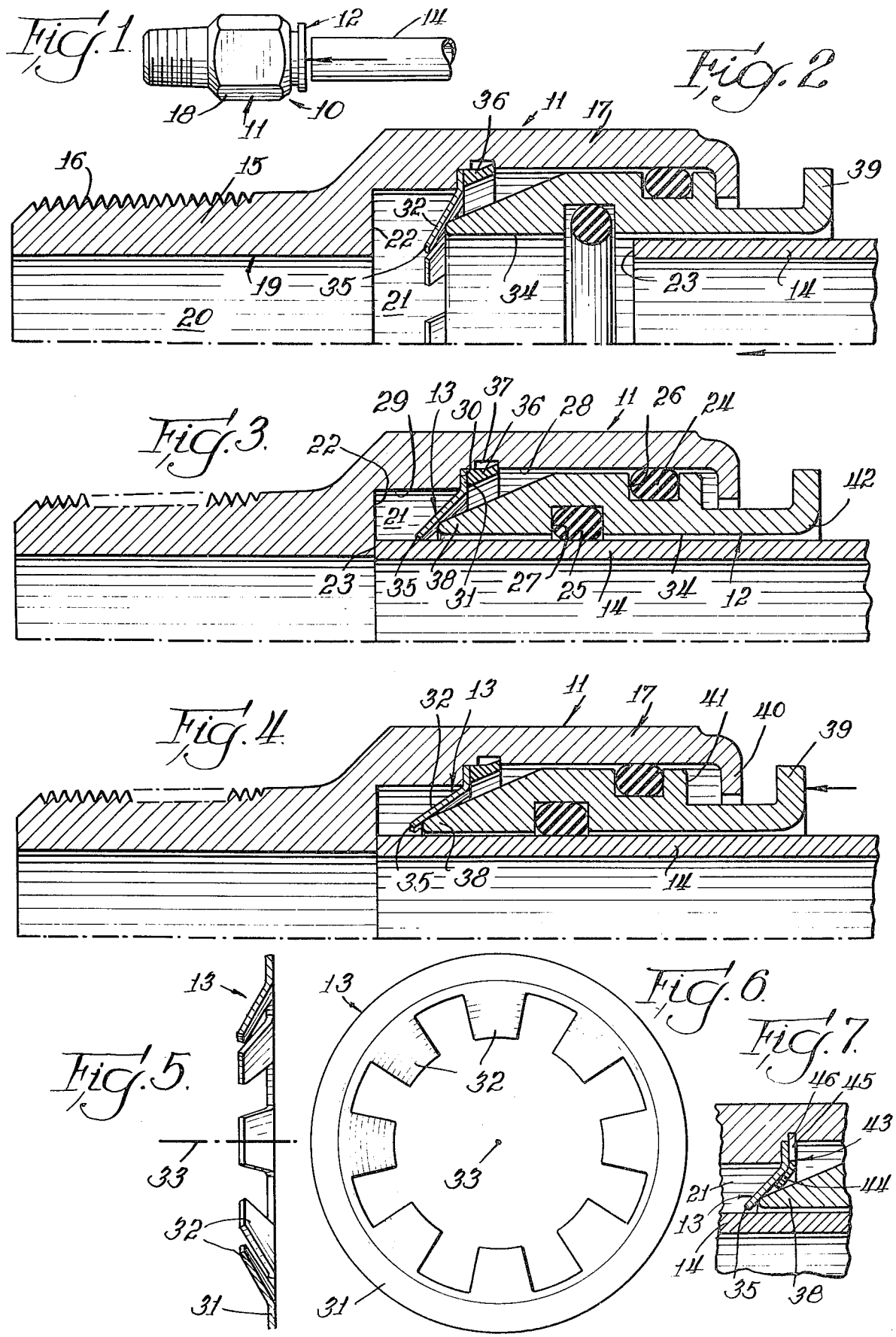

PUSH-PULL FITTING

BACKGROUND OF THE INVENTION

1. Field of the Invention

This invention relates to tube fittings and in particular to push-pull type tube fittings arranged for facilitated installation and removal of tube ends.

2. Description of the Prior Art

One improved form of quick-connect type tube fitting is shown in U.S. Pat. No. 3,062,240, of George E. Franck, which patent is owned by the assignee hereof. Therein, a pivotable pawl is provided for locking the tube against axial withdrawal. The pawl carries a biting edge which digs into the tube automatically to prevent such withdrawal. When it is desired to release the tube, however, the pawl is manipulated by means of a knob portion thereof to move the pawl slightly radially outwardly and away from contact with the tube wall surface.

In U.S. Pat. No. 3,291,510, of Joseph D. Kody, which patent is also owned by the assignee hereof, a tube fitting is shown to include an annular springy retainer for effectively positively gripping the tubing and a sealing and gripping ring cooperating with the retainer for sealingly retaining the tube in the fitting. The fitting provides a positive retention of the tube notwithstanding the presence of severe vibrations and high pressure while permitting limited axial and transverse displacement of the tube without loosening of the connection.

Jacob J. Hamburg, in U.S. Pat. No. 3,633,944, discloses a tube coupling of the slip-in type generally similar to that of the Kody patent in providing a sequential arrangement of a spring retainer ring and a resilient sealing ring.

Jacques Sapy et al show in U.S. Pat. No. 3,653,689, a releasable coupling having a clamping member provided with a plurality of flexible jaws. The clamping member has an inclined surface cooperating with a conical surface of a collar to force the jaws inwardly to clamp a tube received in the socket. A packing ring is retained inwardly of the jaws.

In U.S. Pat. No. 3,909,046, of Andre Legris, a connector for fluid conduits is shown which is generally similar to the Sapy et al patent in providing a clamp having pipe-engaging jaws and an inner sealing ring.

In German Pat. No. 005711/75, of Willy Gassert, a fitting is shown having a springy retainer outwardly of means for positioning a plurality of sealing rings.

A number of other tube fittings are known in the prior art. Illustratively, a tube fitting known as the "Sogeclip" tube fitting is shown in a sales leaflet to include a springy retainer radially outwardly of a pair of tubular elements compressing therebetween an O-ring. The springy retainer includes an outer portion extending between the O-ring and body and a variable compression of the O-ring is effected by applying force to the outer tubular element.

In a sales leaflet of Virgo Fluid-Power Corporation, Norton, Massachusetts, a fitting is shown to include a depressible latch locking the latch to the fitting body with the fitting being maintained locked to the tubing at all times.

In the German sales leaflet of Martonair, D1400, a Lynfitting Series 3000 is shown to have a plurality of jaws outwardly of an O-ring for use in connecting a nylon tube to the fitting.

SUMMARY OF THE INVENTION

The present invention comprehends an improved tube fitting of the push-pull type including a carrier through which the tube end is inserted into the fitting body recess.

Sealing means are carried by the carrier for maintained accurately prestressed sealing of the tube end to the body and in the illustrated embodiment, include an inner seal ring engaging the tube end and an outer seal ring engaging the fitting body.

The seal rings may be received in annular grooves in the carrier accurately sized to provide the desired prestressing of the seal rings.

An annular retainer provided with inwardly projecting spring fingers is provided axially inwardly of the carrier. The spring fingers are arranged in a frustoconical array angled radially and axially inwardly so as to permit the tube end to move readily therepast to the fully inserted position within the fitting recess.

The distal end of the spring fingers defines a biting edge biased into engagement with the outer surface of the tube wall. An urging of the tube end axially outwardly from the recess causes the spring fingers to bite into the tube wall and thereby effectively lock the tube wall against axial outward displacement.

In one form, a back-up spring is provided to provide a spring constant in the tube withdrawal-preventing action greater than the spring constant in the tube inserting action.

The retainer may be locked in the recess by a suitable locking ring, and in the modified form, the back-up ring may serve as the locking means.

The tube end may be withdrawn axially outwardly from the recess when desired by simple inward movement of the carrier to cause an actuator portion at the inner end thereof to engage the spring fingers and urge them outwardly away from the tube wall.

The illustrated spring finger retainer comprises a generally flat annular washer-type retainer of relatively simple and inexpensive construction.

In the present invention, the carrier synergistically defines means for providing maintained accurate prestressed sealing of the tube to the body, provides means for selectively releasing the tube locking means, and provides means for maintaining axial alignment of the tube end with the fitting bore. As the locking means is releasably connected to the tube end, the tube end may be readily withdrawn and a substitute tube end inserted if desired.

The tube fitting of the present invention is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein:

FIG. 1 is a side elevation of a tube fitting embodying the invention with a tube end to be installed therein shown in association therewith;

FIG. 2 is a fragmentary diametric enlarged section illustrating the insertion of the tube end into the tube fitting;

FIG. 3 is a fragmentary diametric section illustrating the arrangement of the fitting with the tube end fully inserted therein;

FIG. 4 is a fragmentary diametric section illustrating the rearrangement of the tube fitting to release the locking means for axial withdrawal of the tube end;

FIG. 5 is a side elevation of the locking means;

FIG. 6 is an end view thereof; and

FIG. 7 is a fragmentary diametric section illustrating a modified form of locking ring embodying the invention.

DESCRIPTION OF THE PREFERRED EMBODIMENTS

In the exemplary embodiment of the invention as disclosed in the drawing, a tube fitting generally designated 10 is shown to include a body 11, a carrier 12, and a locking means generally designated 13. Fitting 10 is adapted to be sealingly connected to a tube end 14 such as formed of relatively soft material, such as synthetic resin. The fitting is adapted to provide a push-pull type connection and disconnection of the tube end thereto.

Body 11 defines an inner end 15 having an externally threaded connecting portion 16 and an axially outer tube-engaging portion 17 defining a plurality of flats 18. The body is provided with a through bore generally designated 19 having an axially inner portion 20 and an axially outer enlarged recess portion 21. At its inner end, the recess 21 is defined by a planar annular shoulder 22 adapted to be engaged by the distal end 23 of the tube end when the tube end is fully inserted into the recess 21, as shown in FIG. 3.

When so installed in recess 21, the tube end 14 is sealed to the body 11, as shown in FIG. 3, by an improved sealing means including an outer seal ring 24 and an inner seal ring 25 carried by the carrier 12 in a radially outwardly opening outer annular recess 26 and a radially inwardly opening annular inner recess 27, respectively. Bore recess 21 includes an outer portion 28 and an inner portion 29 with an intermediate planar radial shoulder 30 therebetween. Seal ring 24 and recess 26 are preselected to provide a prestressed sealing engagement of the O-ring with the body portion in recess portion 28, and seal ring 25 and annular recess 27 are preselected to provide a prestressed sealed engagement with the tube end 14.

As indicated briefly above, locking means 13 are provided for effectively positively retaining tube end 14 in the fitting in the assembled arrangement, as shown in FIG. 3. More specifically, the locking means comprises an annular retainer, which, as shown in FIGS. 5 and 6, includes an outer annular flat ring portion 31 and a plurality of axially and radially inwardly projecting spring fingers 32. In the illustrated embodiment, the spring fingers are spaced equiangularly about the axis 33 of the retainer. As shown in FIG. 5, the spring fingers define a frustoconical array extending at an angle of greater than 45° to the axis 33 so that effectively, the retainer defines a flat annular washer-type retainer of low cost and simple construction.

As shown in FIG. 2, in the undeflected arrangement, the spring fingers extend into the path of movement of the tube end 14 through the tubular bore 34 of the carrier into abutment with shoulder 22 of the body. Distal end 23 of the tube end deflects the spring fingers radially outwardly in moving therepast so that the distal end 35 of the spring fingers slides along the outer surface of the tube end.

Distal end 35 of the spring fingers defines a biting edge adapted to bite into the tube end wall as an incident of urging of the tube end wall axially outwardly away from shoulder 22 in the installed arrangement of the fitting, as shown in FIG. 3. As further shown therein, the outer portion 31 of the retainer is retained against shoulder 30 of recess 21 by a locking ring 36 which may be staked into an annular groove 37 in the body portion defining recess portion 28 to secure the retainer 13 in the recess. Thus, tube end 14 is effectly positively retained against undesirable axial outward withdrawal in the installed arrangement.

As further indicated briefly above, carrier 12 synergistically further defines means for effecting release of the tube end when desired. For this purpose, the carrier is provided with an axially inner actuator portion 38 adapted to engage the spring fingers 32 of the retainer 13 and urge them radially outwardly from the wall of tube end 14 as an incident of an axially inward movement of the carrier, as shown in FIG. 4. The carrier may be readily moved inwardly by a fingertip manipulation of an outer outturned flange 39 thereof.

The carrier may be axially retained within axially outer portion 17 of body 11 by the reception of an inturned flange 40 on the body received within an outwardly opening annular recess 41 at the outer end of the carrier.

Seal rings 24 and 25 may comprise conventional O-rings formed of suitable resilient material. While providing a preselected accurately prestressed sealing of the tube end to the body, the seal rings further provide, synergistically, an augmented retention of the tube end in the assembled arrangement of FIG. 3. The prestressing, however, is preselected to permit facilitated withdrawal of the tube end upon release of the locking ring 13, as discussed above.

The carrier further serves as means for preventing undesirable angular deflection of the tube end 14 in providing a relatively long support surface defined by the carrier bore 34. Additionally, the outer end of bore 34 may be defined by a rounded, outwardly flaring surface 42 for preventing notching of the tube end 14 thereat.

The invention further comprehends, as shown in FIG. 7, the provision of means for providing a double spring constant in the action of the locking ring 13. More specifically, as shown in FIG. 7, a back-up spring 43 may be provided having a frustoconical inner portion 44 spaced outwardly of the biting edge 35 so as to clear the actuator portion 38 of the carrier and thus permit release of the biting edge 35 from the wall of tube end 14 in the manner discussed above. However, the back-up spring 43 provides an additional resistance to the axial outward displacement of biting edge 35 so as to provide increased resistance to the axial withdrawal of the tube end 14.

Synergistically, back-up spring 43 may further define the means for locking the retaining ring 13 in recess 21. More specifically, the outer portion 45 of the back-up spring 43 may comprise a split annular portion adapted to be received in an inwardly opening axial groove 46 of the body.

Thus, back-up spring 43 provides a further improved retention of the tube end in the fitting while yet providing a similar low cost extremely simple construction of the fitting providing facilitated push-pull installation of the tube end 14 therein.

The foregoing disclosure of specific embodiments is illustrative of the broad inventive concepts comprehended by the invention.

We claim:

1. In a tube fitting having a body provided with a through bore having an outwardly opening end adapted to receive the end of a tube, the improvement comprising: a one-piece annular carrier axially movably retained in said bore end having a through bore adapted to pass said tube end therethrough, an axially inner actuating portion, an axially outer manipulating portion extending out of the body and being accessible at said bore end, a mid-portion having a radially inwardly opening annular groove and a radially outwardly opening annular groove; first and second separate sealing rings carried by said carrier axially outwardly of said actuating portion, said first ring being disposed in said radially inwardly opening annular groove slidably sealingly engaging a portion of the tube end and said second ring being disposed in said radially outwardly opening annular groove slidably sealingly engaging only the body for maintained accurately prestressed sealing of said tube end to the body; a retainer positioned axially inwardly of said sealing rings and having at least one radially and axially inwardly projecting spring finger terminating in a locking edge axially inwardly of said carrier; and means positioned axially inwardly of said sealing rings for retaining said retainer to said body in said bore end to have said locking edge of the spring finger resiliently biased against said tube end axially inwardly of the portion thereof engaged by said first sealing ring while permitting said tube end to be moved axially inwardly into said bore end past said spring finger and to lock said tube as an incident of attempted subsequent axial outward movement of said tube end, thereby to retain said tube end in said bore end, said carrier actuating portion being axially inwardly movable in said bore end directly with said manipulating portion while effectively maintaining said prestressed sealing to cause said actuating portion to engage effectively positively said spring finger and urge the locking edge thereof radially outwardly from said tube end thereby to permit axial withdrawal of said tube end from said bore end through said carrier bore.

2. The tube fitting of claim 1 wherein said retainer comprises an annular element.

3. The tube fitting of claim 1 wherein said retainer comprises an annular element having a plurality of equiangularly spaced inwardly projecting spring fingers in a frustoconical array.

4. The tube fitting of claim 1 wherein said retainer comprises an annular element having a plurality of equiangularly spaced inwardly projecting spring fingers in a frustoconical array and a flat, annular, radially outer mounting portion retained to said body by said retaining means.

5. The tube fitting of claim 1 wherein said retainer comprises an annular element having a plurality of equiangularly spaced inwardly projecting spring fingers in a frustoconical array and a flat, annular, radially outer mounting portion retained to said body by said retaining means, said annular array extending at an angle of greater than 45° to the retainer axis.

6. The tube fitting of claim 1 further including additional biasing means for causing the resistance to axial outward movement of said locking edge to be greater than the resistance to said radially outward movement thereof by said carrier actuating portion.

7. In a tube fitting having a body provided with a through bore having an enlarged outwardly opening recess adapted to receive the end of a tube and defining an axially inner shoulder, the improvement comprising: a one-piece annular carrier in said recess having a through bore adapted to pass said tube end therethrough into abutment with said shoulder an axially inner actuating portion, an axially outer manipulating portion extending out of the body and being accessible at said bore end, a mid-portion having a radially inwardly opening annular groove and a radially outwardly opening annular groove spaced axially from said inwardly opening annular groove; first and second separate sealing rings carried by said carrier axially outwardly of said actuating portion, said first sealing rings being disposed in said radially inwardly opening annular groove slidably sealingly engaging a portion of the tube end and said second sealing ring being disposed in said radially outwardly opening annular groove slidably sealingly engaging only the body for maintained accurately prestressed sealing of said tube end to the body; spring finger means having a biting edge and means for retaining said spring finger means in said recess axially inwardly of said carrier and said sealing rings with said biting edge of the spring finger means resiliently biased against said tube end axially inwardly of the portion thereof engaged by said first sealing ring while permitting said tube end to be moved axially inwardly into said recess past said spring finger means, and to bite into said tube as an incident of attempted subsequent axial outward movement of said tube end away from said shoulder, thereby to lock said tube end in said recess, said carrier actuating portion being axially inwardly movable in said recess directly with said manipulating portion while effectively maintaining the prestressing of said sealing rings to cause said actuating portion to engage effectively positively said spring finger means and urge the biting edge thereof radially outwardly from said tube end thereby to permit axial withdrawal of said tube end from said recess through said carrier bore.

8. The tube fitting of claim 7 wherein said spring finger means comprises a substantially flat annular spring.

9. The tube fitting of claim 7 wherein said sealing rings comprise O-rings.

10. The tube fitting of claim 7 wherein back-up spring means are provided for resiliently supporting said spring finger means against axial outward movement of the biting edge.

11. The tube fitting of claim 7 wherein back-up spring means are provided for unilaterally resiliently supporting said spring finger means.

12. The tube fitting of claim 7 wherein back-up spring means are provided for resiliently supporting said spring finger means against axial outward movement of the biting edge, and locking the spring finger means to said body.

13. The tube fitting of claim 7 wherein a locking element is radially outwardly enlarged into locked engagement with said body adjacent said spring finger means to retain the spring finger means in position within said recess.

14. The tube fitting of claim 7 further including additional biasing means for causing the resistance to axial outward movement of said biting edge to be greater than the resistance to said radially outward movement thereof by said carrier actuating portion.

* * * * *